United States Patent [19]

Ross

[11] Patent Number: 5,530,040
[45] Date of Patent: Jun. 25, 1996

[54] TRACTION COMPOSITION FOR RUBBER

[76] Inventor: Donald B. Ross, P.O. Box 423, Markham, Ontario, Canada, L3P 3R1

[21] Appl. No.: 422,418

[22] Filed: Apr. 14, 1995

[51] Int. Cl.$^6$ ..................................................... C08K 5/13
[52] U.S. Cl. ........................... 524/73; 524/270; 524/271; 524/588; 524/903
[58] Field of Search ............................. 524/73, 270, 271, 524/588, 903

[56] References Cited

U.S. PATENT DOCUMENTS

| | | | |
|---|---|---|---|
| 2,752,256 | 6/1956 | Hargis | 106/36 |
| 2,921,918 | 1/1960 | Mooney et al. | 260/27 |
| 3,271,170 | 9/1966 | Ahlberg et al. | 106/36 |
| 3,312,643 | 4/1967 | Ball | 524/73 |
| 3,475,202 | 10/1969 | Byers | 117/139 |
| 4,789,190 | 12/1988 | Eike et al. | 291/6 |
| 5,100,175 | 3/1992 | Swallow et al. | 280/757 |
| 5,371,136 | 12/1994 | Brooks et al. | 524/271 |

FOREIGN PATENT DOCUMENTS

| | | | |
|---|---|---|---|
| 3107219 | 9/1989 | Germany . | |
| 58-99144 | 6/1983 | Japan | 524/271 |

*Primary Examiner*—Mark D. Sweet
*Attorney, Agent, or Firm*—Seidel, Gonda, Lavorgna, & Monaco

[57] ABSTRACT

A traction composition is comprised of a lignin-based phenolic compound, a silicone resin, a rosin and a suitable carrier. The traction composition may be applied to the surfaces of wet or dry vehicle tires to impart anti-slip properties thereto. In accordance with the present invention, the anti-slip properties have increased durability so that the tires have good traction over a longer distance of travel.

30 Claims, No Drawings

TRACTION COMPOSITION FOR RUBBER

FIELD OF THE INVENTION

The present invention relates to a traction composition for rubber surfaces, such as vehicle tires, and, in particular, to a composition for application to vehicle tires to improve the durability of the anti-slip properties thereof.

BACKGROUND OF THE INVENTION

Vehicle tires, and particularly tires on which the tread has become completely or at least partially removed through wear, may have insufficient frictional engagement with a road surface under certain conditions to permit the vehicle to be propelled along road surfaces which are ice-, snow- or mud-covered. Accordingly, a number of compositions have been developed for application to the surface of a vehicle tire to increase the traction between the tire and the road surface.

U.S. Pat. No. 2,752,256 (Hargis, A. H., Jun. 26, 1956) relates to a composition for coating tires comprising methanol, sodium hypochlorite, sodium chloride and water. The first three components have the property of lowering the freezing temperature of water in addition to being miscible and soluble in water. Methanol acts to prepare the tire surface for application. Sodium hypochlorite, when dissolved in water and alcohol, forms a tacky film on the tire surface.

U.S. Pat. No. 2,921,918 (Mooney, M., Jan. 19, 1960) describes an anti-skid coating comprising wood resin, a maleic anhydride modified butadiene-acrylonitrile elastomer, a plasticizer, methanol and acetone. The plasticizer is preferably dibutyl phthalate.

U.S. Pat. No. 3,271,170 (Ahlberg, R. E. et al, Sep. 6, 1966) discloses a traction increaser consisting of rosin and polymerized 2,2,4-trimethyldihdroquinoline dissolved in a lower aliphatic organic solvent, such as methanol.

U.S. Pat. No. 3,475,205 (Byers, J. H., Oct. 28, 1969) relates to a liquid coating for rubber surfaces consisting of finely divided metallic zinc or finely divided manganese dioxide and a rubber-bonding adhesive agent to bond the particles of zinc or manganese dioxide to the rubber surface.

German Offenlegungsschrift Number 31 07 219 relates to application of an adhesive and a friction enhancing agent on vehicle tires. A damp resistant glue is applied to a tire surface and the vehicle is then run over large-grained sand to form a thick layer of sand on the tire surface.

One of the problems with prior art compositions is that, while they may be helpful in providing enough traction to allow the vehicle to start moving, they do not provide increased traction over a distance of travel. The present invention aims to overcome the problems of the prior art compositions by providing an improved composition for imparting traction properties to rubber surfaces. The traction composition of the present invention has increased wearability and is readily applied to rubber surfaces.

SUMMARY OF THE INVENTION

According to one aspect of the present invention, there is provided a traction composition for rubber, comprising a lignin-based phenolic compound, a silicone resin, a rosin and a suitable carrier.

According to another aspect of the present invention, there is provided a method for improving wearability of a traction composition for rubber, comprising adding a silicone resin to the traction composition.

The rubber may be synthetic or natural rubber.

DETAILED DESCRIPTION OF THE INVENTION

The traction composition of the present invention comprises a lignin-based phenolic compound, a silicone resin, rosin and a suitable carrier. The traction composition provides an increased coefficient of friction between a vehicle tire and a road surface. The traction composition does not affect the tire rubber other than to provide a tacky film on the surface thereof which, in turn, provides enough traction for the vehicle to start moving on an ice- or snow-covered road surface. Furthermore, the traction composition has increased wearability, as compared to the prior art compositions, so that the film applied to the surface of the tire provides traction over a longer distance of travel.

Lignin is a naturally-occurring polymer which holds plant fibres (especially wood fibres) together. The lignin-based phenolic compound used in the composition of the present invention is recovered from wood-processing wastes. Examples of suitable lignin-based compounds are produced by Lenox Resources, Ltd. (Port Huron, Mich., U.S.A.) and are sold under the trademarks LR-8310 and LR-8311. These compounds are solid materials which are readily soluble in alcohol. The viscosity of a 70% solution of LR-8310™ and LR-8311™ in methanol at 25° C. is in the range of from about 300 to 500 cp. The lignin-based phenolic compound imparts adhesion qualities to the traction composition of the present invention.

The concentration of lignin-based phenolic compound is advantageously in the range of from about 5 to 40% (w/w) and preferably in the range of from about 10 to 25% (w/w).

While the lignin-based phenolic compound described above does have good adhesion properties, it is a soft compound that does not wear well. In accordance with the traction composition of the present invention, wearability properties are imparted thereto by a silicone resin. Suitable silicone resins are one or more silicone resins of the general formula —$R_2SiO$—, wherein R represents hydrogen or an organic substituent, with or without cross-linking.

Examples of silicone resins are polydimethylsiloxane, polymethylsiloxane, related polymers and combinations thereof. The silicone resin may be provided in pure form or dissolved or dispersed in an organic solvent. A particularly suitable silicone resin is an isopropyl alcohol-based solution of a methyl silicone resin having the general formula [MeRSiO]$_k$ wherein R represents Me or $C_3H_6OCH_2CHCH_2O$ sold under the trademark GP-187 by Genesee Polymers Corporation (Flint, Mich., U.S.A.). Preferably, the silicone resin is a siloxane copolymer having the general formula [MeSiO]$_n$[MeR$_1$SiO]$_m$ wherein n:m is about 9:1 and $R_1$ represents $C_3H_6OCH_2CHCH_2O$, alone or in combination with the GP-187™ methyl silicone resin.

The concentration of silicone resin is advantageously in the range of from about 0.05 to 20% (w/w). Preferably, the concentration of silicone resin is in the range of from about 0.05 to 10% (w/w). Greater concentrations are effective but may be uneconomical. A concentration of 100% (w/w) silicone resin is not effective as a traction composition, as demonstrated in Example 4.

A preferred rosin for use in the composition according to the present invention is the partially polymerized (dimerized) rosin marketed under the trademark POLY-PALE® by Hercules Incorporated (Wilmington, Del., U.S.A.). POLY-PALE® is available in solid and flake forms and is soluble in aliphatic, aromatic and chlorinated hydrocarbons, ketones and esters and partially soluble in methanol, ethanol, butanol and isopropanol. Other suitable rosins are a dimerized rosin marketed under the trademark DYMEREX by Hercules Incorporated and a tall oil rosin marketed under the trademark SYLVAROS by The Glidden Company (Chemicals Group) of Cleveland, Ohio, U.S.A.

The concentration of rosin is advantageously in the range of from about 5 to 50% (w/w) and preferably in the range of from about 10 to 40% (w/w).

Suitable solvents include water-miscible organic solvents, such as lower alcohol, for example methanol, ethanol or propanol, acetone, methyl ethyl ketone and methyl isobutyl ketone. The solvent acts as a carrier for the other components of the composition as well as preparing the surface for application, especially in the case of wet tires, to allow the composition to adhere to the tire surface.

Methanol is preferred over ethanol because it results in faster drying of the composition on the tires. A particularly suitable carrier is a mixture of methanol and methyl ethyl ketone.

The concentration of solvent is not critical and any concentration can be used, although, as will be appreciated, the higher the proportion of solvent the lower will be the viscosity of the composition, thereby affecting the traction properties.

The composition may be applied to wet or dry tires. While the traction composition of the present invention is effective even when applied to only that part of the tire which is accessible, the composition is preferably applied to substantially the entire surface by applying the composition to the accessible part of the tire and then rotating the tire to expose the previously inaccessible portions of the tire.

The composition may conveniently be applied to vehicle tires from an aerosol can which may be of conventional construction. In this case, the viscosity of the composition, and hence the proportion of the solvent, is so arranged as to achieve the optimum spray characteristics of the traction composition from the can. The traction composition is pressurized in an aerosol can with a suitable propellant including carbon dioxide, nitrous oxide, a hydrocarbon such as propane or butane, dimethyl ether and mixtures thereof. Preferably, the gas is carbon dioxide.

While for ease of handling and application it is preferred that the composition according to the invention be applied to vehicle tires from an aerosol can, it is to be understood that the composition may, alternatively, be applied by other forms of spray equipment, including pump bottles, or, for example, by brushes or rollers.

One alternate device is described in U.S. Pat. No. 4,789, 190 (Eike et al, Dec. 6, 1988) which relates to a device for spraying a sticky or tacky liquid contained in a dosing reservoir through nozzles located near the tires. The device is controlled by the driver while the vehicle is in motion.

Another apparatus for enhancing traction is described in U.S. Pat. No. 5,100,175 (Swallow et al, Mar. 31, 1992). A reservoir of a traction enhancing liquid is sprayed by an aperture spherical spray head onto the tires of the vehicle. A cylindrical brush is mounted on the nozzle to enhance the application of fluid to the tire surface.

The following Examples illustrate the present invention.

EXAMPLE 1

A traction composition of the present invention was prepared by dissolving rosin (POLY-PALE®, Hercules Incorporated) in a mixture of methanol and methyl ethyl ketone. Silicone resin (GP-187™, Genesee Polymers Corporation) and a lignin-based phenolic compound (LR-8311™, Lenox Resources, Ltd.) were added gradually with mixing to obtain a uniform suspension. The liquid was then put into an aerosol can and pressurized with carbon dioxide. The concentration of each component of the traction composition was as follows:

| Component | Concentration % (w/w) |
| --- | --- |
| Lignin-based compound | 18.28% |
| Silicone resin in isopropanol | 4.47% |
| Rosin | 21.86% |
| Methanol | 43.89% |
| Methyl ethyl ketone | 5.50% |
| $CO_2$ | 6.00% |

EXAMPLE 2

The traction composition of Example 1 was prepared with 2% (w/w) of a solution of 4.0 g of siloxane copolymer $[MeSiO]_n[MeR_1SiO]_m$ wherein n:m is about 9:1 and $R_1$ represents $C_3H_6OCH_2CHCH_2O$ dissolved in 1 liter of isopropanol.

EXAMPLE 3

The traction composition of Example 1 was prepared with 5% (w/w) of a solution of 4.0 g of siloxane copolymer $[MeSiO]_n[MeR_1SiO]_m$ wherein n:m is about 9:1 and $R_1$ represents $C_3H_6OCH_2CHCH_2O$ dissolved in 1 liter of isopropanol.

EXAMPLE 4

A rubber pad was attached to the base of a block of wood. The rubber-based block of wood weighed an average of 205.5 g. A cable was attached at one end to the block of wood and at the other end to a hook for holding a bucket. The rubber pad was sprayed with a traction spray composition and allowed to dry at room temperature for 2 minutes prior to the test. The rubber-based block was then set on a 12"×12"×¼" sheet of polyethylene to simulate an ice surface (polyethylene sheets are frequently used to test ice hockey pucks). The surface of the polyethylene sheet was cleaned with a solvent after each test. The cable was mounted over a pulley so that the bucket hung freely and sand was added to the bucket until the rubber-based block of wood started to slide over the surface of the polyethylene. The combined weight of the hook, pail and sand required to move the block of wood was recorded and is presented below.

| Composition | Weight Required to move block (g) | % Increase in Traction |
| --- | --- | --- |
| No spray | 122.2($W_1$) | — |
| Prior Art Traction Spray | 272 | 122 |
| Example 1 | 188.7 | 54 |
| Example 2 | 363.2 | 197 |
| Example 3 | 468.9 | 284 |
| Silicone Resin alone | 185.5 | 52 |

$$\% \text{ Increase in Traction} = \frac{(W_2 - W_1)}{W_1} \times 100$$

EXAMPLE 5

The traction composition of the present invention was then tested on an ice rink with a 1988 BUICK LE SABRE™ with from wheel drive. The tires had a tread depth of 5 mm and the tire pressure was 32 psig on all four tires.

The rink (185 feet×85 feet) was flooded prior to the test. The rink temperature was just below 0° C. and the ice surface froze immediately giving a surface ice condition similar to that of black ice.

The front tires were sprayed with the traction composition prepared in Example 3. The back tires were not sprayed with the traction composition. The car was then driven around the rink in laps of about 73 feet×173 feet. The car was driven around the rink for 10 laps in one direction and 10 laps in the opposite direction, over a distance of approximately 492 feet per lap at speeds of up to 20 km/h. The front tires exhibited good traction in the corners of the rink and on the straight sections of the rink. The driver could feel that the front tires gripped the ice surface. However, the back tires had no traction on the ice surface. This was particularly noticeable when rounding the corners of the rink.

The back tires of the car were then sprayed with the traction composition prepared in Example 2. The driver had better control of the car. However, the car still tended to fish-tail in the corners.

Traction was also tested by braking in each corner as the car was driven around the rink for 10 laps. The car came to a complete stop in from about 2 to 4 feet when the brakes were applied.

The car was then driven around the rink in a FIG. 8 pattern for 10 laps in one direction and then 10 laps in the opposite direction.

The above tests were run twice over a period of about 5 hours and a distance of about 25 km, demonstrating the improved wearability of the traction composition of the present invention.

EXAMPLE 6

The traction composition of the present invention was then tested on the same ice rink with a 1992 FORD TAURUS™ with front wheel drive. The tires were very new and had a tread depth of 8 mm. All four tires had a tire pressure of 32 psig. The car was first driven around the rink without any applied traction composition. The driver was not able to adequately control the car and the front tires were then sprayed with the traction composition of Example 2. The front tires exhibited good traction in the corners of the rink and on the straight sections of the rink. The driver could feel that the from tires gripped the ice surface. However, the back tires had no traction on the ice surface. This was particularly noticeable when rounding the corners of the rink.

The back tires of the car were then sprayed with the traction composition prepared in Example 3. The tests described in Example 5 were conducted over a period of about 5 hours. The driver had better control of the car, even in the corners and when the car was driven in a zigzag pattern in the straight portions of the rink.

The car was driven around the rink in laps of about 73 feet×173 feet for 10 laps in one direction and 10 laps in the opposite direction, at speeds of up to 20 km/h. The front tires exhibited good traction in the corners of the rink and on the straight sections of the rink. The driver could feel that the front tires gripped the ice surface. However, the back tires had no traction on the ice surface. This was particularly noticeable when rounding the corners of the rink.

Traction was also tested by braking in each corner as the car was driven around the rink for 10 laps. The car came to a complete stop in from about 2 to 4 feet when the brakes were applied.

The car was then driven around the rink in a FIG. 8 pattern for 10 laps in one direction and then 10 laps in the opposite direction.

The above tests were run twice over a period of about 5 hours and a distance of about 25 km, demonstrating the improved wearability of the traction composition of the present invention.

EXAMPLE 7

Immediately after conducting the tests of Examples 5 and 6, the cars driven in the tests were driven on roads during a snowstorm, without having an additional traction (invention) coating applied. The road conditions ranged from slush to hard-packed snow with ice patches. Both drivers reported better traction, as compared to driving conditions under similar road and weather conditions without a traction composition. One car was driven approximately 12 km while the other car was driven approximately 48 km. Both drivers felt confident enough to make frequent lane changes during the snowstorm. The improved traction properties appeared to last for the duration of both trips.

While the discussion and examples presented hereinabove refer to tire rubber, it will be appreciated by those skilled in the art that the traction composition of the present invention is also applicable to other rubber surfaces, for example boot soles, wherein it is desired to increase the traction properties thereof.

I claim:

1. A traction composition for rubber, comprising:
   (a) a lignin-based phenolic compound in a concentration in the range of about 5% to about 40% (w/w);
   (b) a silicone resin in a concentration in the range of about 0.05% to about 20% (w/w);
   a rosin in a concentration in the range of about 5% to about 50% (w/w); and
   the remainder of the traction composition comprising a suitable carrier.

2. A traction composition according to claim 1, wherein the concentration of the lignin-based phenolic compound is in the range of from about 10 to 25% (w/w).

3. A traction composition according to claim 1, wherein the silicone resin is selected from the group consisting of polydimethylsiloxane, polymethylsiloxane, related polymers and combinations thereof.

4. A traction composition according to claim 1, wherein the silicone resin is a methyl silicone resin having the general formmla $[MeRSiO]_k$, wherein R represents Me or $C_3H_6OCH_2CHCH_2O$.

5. A traction composition according to claim 1, wherein the silicone resin is a siloxane copolymer having the general formula $[MeSiO]_n[MeR_1SiO]_m$, wherein n:m is about 9:1 and $R_1$ represents $C_3H_6OCH_2CHCH_2O$.

6. A traction composition according to claim 1, wherein the silicone resin is a mixture of a methyl silicone resin having the general formula $[MeRSiO]_k$, wherein R represents Me or $C_3H_6OCH_2CHCH_2O$ and a siloxane copolymer having the general formula $[MeSiO]_n[MeR_1SiO]_m$, wherein n:m is about 9:1 and $R_1$ represents $C_3H_6OCH_2CHCH_2O$.

7. A traction composition according to claim 1, wherein the concentration of silicone resin is in the range of from about 0.05 to 10% (w/w).

8. A traction composition according to claim 1, wherein the rosin is a partially polymerized rosin.

9. A traction composition according to claim 1, wherein the rosin is a partially dimerized rosin.

10. A traction composition according to claim 1, wherein the concentration of rosin is in the range of from about 10 to 40% (w/w).

11. A traction composition according to claim 1, wherein the carrier is selected from the group consisting of methanol, ethanol, propanol, acetone, methyl ethyl ketone, methyl isobutyl ketone and mixtures thereof.

12. A traction composition according to claim 1, wherein the carrier is methanol.

13. A traction composition according to claim 1, wherein the carrier is a mixture of methyl ethyl ketone and methanol.

14. A traction composition according to claim 11, wherein the carrier also comprises a propellant.

15. A traction composition according to claim 14, wherein the propellant is carbon dioxide.

16. A method for improving the traction of a tire comprising applying to the tire a traction composition comprising:

(a) a lignin-based phenolic compound in a concentration in the range of about 5% to about 40% (w/w);

(b) a silicone resin in a concentration in the range of about 0.05% to about 20% (w/w);

(c) a rosin with a concentration in the range of about 5% to about 50% (w/w); and (d) the remainder of the traction composition comprising a suitable carrier.

17. A method according to claim 16, wherein the silicone resin is present in a concentration in the range of from about 0.05 to 10% (w/w).

18. A method according to claim 16, wherein the silicone resin is selected from the group consisting of polydimethylsiloxane, polymethylsiloxane, related polymers and combinations thereof.

19. A method according to claim 16, wherein the silicone resin is a methyl silicone resin having the general formula $[MeRSiO]_k$, wherein R represents Me or $C_3H_6OCH_2CHCH_2O$.

20. A method according to claim 16, wherein the silicone resin is a siloxane copolymer having the general formula $[MeSiO]_n[MeR_1SiO]_m$, wherein n:m is about 9:1 and $R_1$ represents $C_3H_6OCH_2CHCH_2O$.

21. A method according to claim 16, wherein the silicone resin is a mixture of a methyl silicone resin having the general formula $[MeRSiO]_k$, wherein R represents Me or $C_3H_6OCH_2CHCH_2O$ and a siloxane copolymer having the general formula $[MeSiO]_n[MeR_1SiO]_m$, wherein n:m is about 9:1 and $R_1$ represents $C_3H_6OCH_2CHCH_2O$.

22. A method according to claim 16, wherein the rosin is a partially polymerized rosin.

23. A method according to claim 16, wherein the rosin is a partially dimerized rosin.

24. A method according to claim 16, wherein the concentration of rosin is in the range of from about 10 to 40% (w/W).

25. A method according to claim 16, wherein the concentration of the lignin-based phenolic compound is in the range of from about 10 to 25% (w/w).

26. A method according to claim 16, wherein the carrier is selected from the group consisting of methanol, ethanol, propanol, acetone, methyl ethyl ketone, methyl isobutyl ketone and mixtures thereof.

27. A method according to claim 16, wherein the carrier is methanol.

28. A method according to claim 16, wherein the carrier is a mixture of methyl ethyl ketone and methanol.

29. A method according to claim 26, wherein the carrier also comprises a propellant.

30. A method according to claim 29, wherein the propellant is carbon dioxide.

* * * * *